United States Patent
Brandsma

(10) Patent No.: US 7,113,691 B1
(45) Date of Patent: Sep. 26, 2006

(54) METHOD OF AND DEVICE FOR RECORDING INFORMATION

(75) Inventor: Ewout Brandsma, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 739 days.

(21) Appl. No.: 09/694,159

(22) Filed: Oct. 23, 2000

(30) Foreign Application Priority Data

Oct. 27, 1999 (EP) .................................. 99203537

(51) Int. Cl.
*H04N 5/91* (2006.01)

(52) U.S. Cl. .................... 386/81; 386/46; 386/113; 369/47.14

(58) Field of Classification Search .................... 386/1, 386/21, 45, 113, 125–126, 105, 106, 46, 81; 369/47.14, 53.15, 53.16, 53.17, 53.47; 360/99.02, 360/99.06
See application file for complete search history.

(56) References Cited

U.S. PATENT DOCUMENTS

| | | | | |
|---|---|---|---|---|
| 4,498,146 A | * | 2/1985 | Martinez | .................... 711/115 |
| 4,849,956 A | * | 7/1989 | Aizawa | .................... 369/53.17 |
| 6,577,812 B1 | * | 6/2003 | Kikuchi et al. | ............. 386/105 |
| 6,654,543 B1 | * | 11/2003 | Ando et al. | ................. 386/125 |

* cited by examiner

*Primary Examiner*—James J. Groody
*Assistant Examiner*—Christopher Onuaku
(74) *Attorney, Agent, or Firm*—Michael E. Belk

(57) ABSTRACT

A method of and an apparatus for writing data on and reading data from a recording medium such as an optical disc, a magnetic disc and, particularly, a tape are described. When a block of the medium is defective, the data to be written in said block is stored in an auxiliary memory. Subsequently, all the data from the auxiliary memory is copied to a predetermined spare area of the medium. Conversely, when the medium is read, data is first copied from the spare area of the medium to the auxiliary memory. If a block then appears to be defective, the correct information is read from the auxiliary memory.

Thus, it is possible to write and read a real-time audio and/or video signal in a reliable manner without the possible presence of any defective blocks affecting the data transfer rate.

16 Claims, 1 Drawing Sheet

METHOD OF AND DEVICE FOR RECORDING INFORMATION

FIELD OF THE INVENTION

The present invention generally relates to the recording of information, particularly digital information, on a recording medium having at least one recording track divided into logic blocks. The present invention relates in particular to tape recording and will therefore be elucidated hereinafter specifically for this example of use but it is emphasized that the present invention likewise applies to other recording media such as, for example, magnetic discs, optical discs etc.

In general, the amount of information to be recorded in a recording session is greater than one block. The information to be recorded, also referred as "file", is then divided into successive data packets having the size of one block, and the successive data packets of a file are recorded in different blocks of the tape. For a rapid data transfer it is then desirable that the successive data packets are recorded in successive blocks. The recording process can then proceed virtually continuously. Likewise, during the subsequent reading (playback) of the information recorded on the tape the read process can proceed continuously.

In practice, a tape may exhibit defective blocks, i.e. blocks where a faultless recording of information is no longer possible and/or where any resulting small write errors can no longer be corrected during reading. Such a block is then no longer suited for recording.

One possibility of still correctly recording the information to be recorded is to skip the defective block and to record it in the next non-defective block. It is also known to reserve a spare recording area on a recording medium, which area is intended for replacement of any defective blocks. When during recording a defective block is found, recording is effected in a block of the spare recording area instead of in the defective block. After recording of a data packet in a block of the spare recording area the recording of the following data packets is continued in a block following the defective block.

A common feature of both methods is that at least one jump of the write head to another position on the recording medium is required and likewise that at least one jump of the read head to another position is required to read the information. These jumps of the read and/or write head take comparatively much time and reduce the average transmission speed of the information. This is particularly undesirable in situations in which a very high transmission speed is required, as for example in a real time recording of audio and/or video signals.

The problem described above even occurs in the case of recording media where the movement of the read and/or write head to another position is comparatively fast, such as an optical disc or a magnetic disc. The problems described above become even more preponderant in the case of a linear recording medium such as a magnetic tape, in which case the write and/or read head is stationary and the relative movement of the write and/or read head is obtained by forward or reverse winding of the tape.

SUMMARY OF THE INVENTION

It is an object of the present invention to provide a solution for the aforementioned problems.

The present invention proposes to solve said problems by temporarily loading the data packet to be recorded into a fast auxiliary memory each time that a defective block is encountered during a recording mode. This fast auxiliary memory can be, for example a RAM or a magnetic disc, or an optical disc etc. Depending on the available storage capacity it is also possible that the data packet to be recorded is first loaded at a very high speed into a first auxiliary memory having a comparatively limited storage capacity, for example a RAM, and from this memory it is copied at a lower speed to a second auxiliary memory having a higher storage capacity, such as for example a magnetic or optical disc, after which the first auxiliary memory is free again. This first auxiliary memory thus in fact functions as a buffer (cache) for the transfer to the second auxiliary memory.

While the data packet to be recorded in the defective block is loaded into the fast auxiliary memory the write head is moved to the next block at the "normal" operating speed. Assuming that the last-mentioned block is not defective, the data packet destined for this block is actually recorded in this block. However, when another defective block is encountered the data packet destined for this defective block is again stored in the auxiliary memory, as described hereinbefore. The tape is then moved at a substantially constant speed without repeated forward and/or reverse winding.

When all the information to be written has thus been recorded the information stored temporarily in the fast auxiliary memory is recorded in a spare area reserved especially for this purpose on the recording medium. In the case that the recording medium is a tape the spare area is preferably situated at the beginning of the tape. Once said information has been copied from the fast auxiliary memory to said spare area reserved on the recording medium, the recording session is finished. It will be evident that, as a result of the proposed recording method, the information processing speed is not affected by the possible occurrence of defective blocks, not even if the number of defective blocks is large.

In accordance with the present invention a similar process is carried out during the playback or read-out of the recorded information. When the tape is loaded into a read apparatus the tape is first rewound to the beginning of the spare recording area and the information recorded in the spare recording area is copied to a fast auxiliary memory. During read-out of the tape the information corresponding to the respective defective block is read out of the fast auxiliary memory each time that a defective block is encountered. Thus, it is also possible to attain the maximum data transfer rate for the read apparatus (maximum device data rate) during read-out without any adverse effect of the possible presence of any defective blocks.

BRIEF DESCRIPTION OF THE DRAWING

These and other aspects, features and advantages of the present invention will be elucidated further by means of the following description with reference to the drawings, in which.

DETAILED DESCRIPTION OF THE PREFERRED EMBODIMENTS

Figure 1:
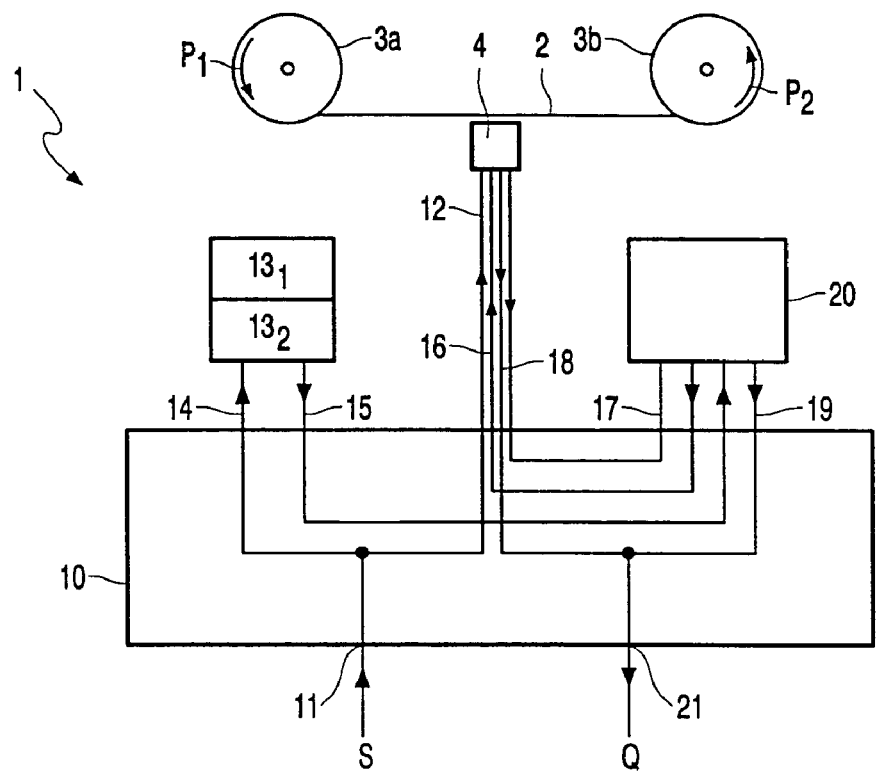
FIG. 1 diagrammatically shows a part of a recording apparatus.
Figure 2:
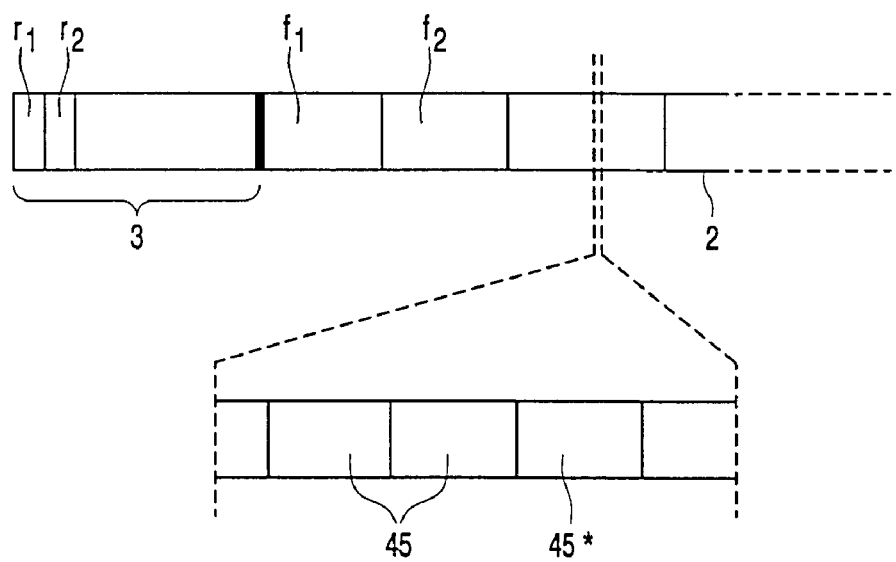
FIG. 2 diagrammatically shows the logic structure of a tape.

FIG. 1 shows a block diagram of a part of a recording apparatus which in general bears the reference numeral 1 and which is suitable for recording real-time video and/or audio signals S on a tape 2. The tape 2 can be a magnetic tape. As is known, the apparatus 1 has a write head 4 for writing information onto the tape 2. The write head 4 is mounted stationarily and the tape wound on reels 3a and 3b is moved past the stationary write head 4, for which purpose the apparatus 1 has drive means for making the reels 3a and 3b rotate, as indicated by the arrows P1 and P2 in FIG. 1, but for the sake of simplicity these drive means are not shown in FIG. 1. The apparatus 1 includes a functional unit 10, which will be referred to as control unit. The control unit 10 is coupled to said reel drive means in order to control said drive means in a manner known per se and not shown. The control unit 10 has an input 11 for receiving a signal S to be recorded and is coupled to the head 5, as indicated diagrammatically by the signal line 12, in order to record the signal S onto the tape 2. FIG. 2 illustrates diagrammatically the logic storage structure of a tape 2. As is shown in FIG. 2, the tape 2 is divided into successive blocks 45. As is known, the information S to be recorded is divided into successive data packets and each data packet is recorded in a block 45, which is referred to hereinafter as "block writing session". For the sake of simplicity it is assumed herein that successive data packets are written into successive blocks 45.

Hereinafter, the aggregate of information to be recorded in response to a write command will be termed a "file"; the entire process of recording a file will be referred to as a "file writing session".

During or immediately after the recording of a data packet into a block 45 it is tested whether the data packet has been written successfully into the relevant block 45. Such test processes are known per se and will not be described in greater detail hereinafter. It is to be noted merely that after a data packet has been written into a block 45 the control unit 10 has information relating to the result of the write operation. Two situations are then possible. A first situation, referred to as "correct", occurs if writing has been performed correctly or if possible errors can be corrected without any problems by means of a standard error correction process. A second situation, referred to as "defective", occurs in the case of a defective block 45*. The control unit 10 is adapted to start a following block writing session with regard to the next data packet in the signal S and the next block 45 of the tape in the customary manner in the case that the situation is "correct" upon completion of a block writing session.

In accordance with an important aspect of the present invention, however, the control unit 10 is adapted to store the relevant data packet temporarily in a fast auxiliary memory 20 of the recording apparatus 1 in the case that the situation is "defective" upon completion of a block writing session. This is referred to as an "auxiliary writing session".

For this purpose the recording apparatus 1 includes a buffer memory 13 associated with the control unit 10. The control unit 10 is adapted to always store the data packet being written instantaneously into a block 45 of the tape 2 during a block writing session also in the buffer memory 13, as is represented by the signal line 14. When at the end of a block writing session the situation is "correct" the information in the buffer memory 13 is no longer needed. However, the control unit 10 is adapted to copy the data of the data packet just processed of the signal S from the buffer memory 13 to the fast auxiliary memory 20, as is represented by the signal line 15, when the situation is "defective" after a block writing session.

It is possible that this copying step proceeds so rapidly that it does not delay the start of a following block writing session. However, in order to be independent of this, it is preferred that the control unit 10 includes at least two buffer memories $13_1$ and $13_2$, and the control unit 10 is adapted to use these two buffer memories $13_1$ and $13_2$ alternately, as a result of which, even while a data packet is being copied from the one buffer memory $13_1$ to the fast auxiliary memory 20, a following block writing session can yet be carried out, in which the relevant data is written into the other buffer memory $13_2$.

Furthermore, it will be possible that the control unit 10 already knows that the relevant block is a defective block before the start of a block writing session. In this case the process of writing to the defective block need not be carried out and the data packet can be loaded directly into the auxiliary memory, either with or without the use of the buffer memory 13.

It is to be noted that recording apparatuses generally include a memory as a buffer for this purpose of coping with speed differences between a data source and the recording medium. Said buffer memory 13 may form part of such a memory or may be a separate memory. In the scope of the present invention it is important that the whole content of a data packet is still present in the buffer memory at the end of a block writing session, in order to enable said data packet to be copied from the buffer memory to the fast auxiliary memory 20 if the block writing session is unsuccessful.

As is known, each block 45 of the tape 2 has a unique number or address, hereinafter referred to as the "block number" B. The start address of the section in the fast auxiliary memory 20 into which a data packet is to be loaded is referred to hereinafter as the "section start address" M. In accordance with an important aspect of the present invention the relevant block number B of the relevant defective block 45* and the relevant section start address M are also stored when a data packet is copied from the buffer memory 13 to the fast auxiliary memory 20. This information, hereinafter also referred to as "bookkeeping data", is preferably loaded into a part of the fast auxiliary memory 20 which has been reserved especially for this purpose, and forms a substitution table M(B).

When all the block writing sessions have been completed the tape 2 contains a new part where the signal S, i.e. the file f, has been recorded. FIG. 2 diagrammatically shows two such files $f_1$ and $f_2$. When it is assumed that said part of the tape 2 contains defective blocks 45* the file f just written exhibits faults because the data packets recorded in these defective blocks 45* are mutilated or missing and the correct data packets are still in the fast auxiliary memory 20. In accordance with an important aspect of the present invention these correct data packets, including said bookkeeping data, are written from the fast auxiliary memory 20 into a spare recording area 3 of the tape, which area has been reserved especially for this purpose and, as is illustrated in FIG. 2, is preferably situated at the beginning of the tape 2. This process will be referred to as a "substitute writing session".

For this, several variants are conceivable. In a first variant the substitute writing session is always carried out for each individual file to be recorded. For this purpose, the control unit 10 is adapted to control said tape transport means upon completion of all the block writing sessions, so as to move the tape 2 with respect to the write head 4 in such a manner that the write head 4 is situated at the beginning of a free portion in the spare recording area 3. Subsequently, the data including the bookkeeping data is copied from the fast auxiliary memory 20 to the spare recording area of the tape 2 under control of the control unit 10, as is represented by the signal line 16 in FIG. 1. Thus, a set of substitute blocks corresponding to the file f is written into the spare recording area 3, which set is referred to hereinafter as a "substitute file r". FIG. 2 shows two such substitute files $r_1$ and $r_2$, corresponding to the files $f_1$ and $f_2$, respectively. After this substitute writing session the file writing session is finished. The apparatus is now ready for a subsequent file writing session.

As an alternative it is possible to perform the substitute writing session not for each file writing session individually but jointly for a plurality of file writing sessions. The apparatus 1 is then already ready to perform a following file writing session when all the block writing sessions belonging to one file writing session have been completed. The substitute data then remains stored in the fast auxiliary memory 20 and the substitute data of a following file writing session is additionally loaded into the auxiliary memory 20. Thus, a plurality of file writing sessions can be performed without the tape having to be wound towards the spare recording area 3 and back between two consecutive file writing sessions. The tape 2 is then rewound to the spare recording area 3 only when the apparatus 1 is turned off or when the control unit 10 receives a command to enable the tape 2 to be removed from the apparatus 1, and one substitute writing session is performed for all the defective blocks 45* of all the files f. Thus, the reserved spare recording area 3 is updated with the information in the auxiliary memory 20 prior to any removal of the tape 2 from the apparatus 1.

The present invention also relates to an apparatus for and a method of reading a tape recorded in accordance with the principles underlying the present invention. Such an apparatus may be a completely other apparatus than the apparatus 1 just described but it is likewise possible that the described apparatus 1 is switchable between a write mode and a read mode. For the sake of convenience reference is made again to FIG. 1 but the apparatus 1 is now termed a read apparatus.

The control unit 10 of the read apparatus 1 is adapted to copy the data from the spare recording area 3, including the bookkeeping data M(B), to the fast auxiliary memory 20, as indicated by the signal line 17, in a preparatory session each time that a new tape 2 is loaded into the read apparatus 1. After this preparatory step the read apparatus 1 is ready for reading an arbitrary file f.

When the read apparatus 1 receives a command from a user to read a given file f, the control unit 10 controls said tape transport means so as to position the head 4, which is now used as a read head, at the beginning of the relevant file f, after which the read-out of the data in the first block 45 of the file f begins. The information thus read is output via an output 21, as is illustrated by means of the signal line 18.

Each time that the read head 4 reaches the beginning of a block 45* whose address appears in the table M(B) of bookkeeping data in the fast auxiliary memory 20, which is an indication that the content of the relevant block 45* having the block number B is unreliable, the control unit 10 determines the start address M of the section of the fast auxiliary memory 20 where the relevant reliable spare data has been stored, which is effected with the aid of the information in said table, after which the control unit 10 reads the spare data out of the fast auxiliary memory 20 and inserts the information thus read into the output signal Q at the output 21, as is indicated by the signal line 19 in FIG. 1. Thus, the information in the defective block 45* need not be read.

This means, in other words, that the correct blocks 45 of the tape 2 are read in the customary manner and the information thus read is output in the customary manner but that the defective blocks 45* are skipped; instead of this, the information in the fast auxiliary memory is read and the information thus read is output in an otherwise customary manner. In this way it is achieved that an audio and/or video signal can be read in real time with a high reliability without the quality of the output signal Q being noticeably affected by any defective sectors 45* of the tape 2. An important aspect of the present invention is then that the tape 2 can be played back with a virtually constant speed, without the read apparatus 1 having to wind the tape 2 back and forth to substitute recording locations. To consult the bookkeeping data M(B) in the fast auxiliary memory 20 the control unit 10 may be adapted to first read the relevant block address B for each new block 45 to be read from the tape 2, then to verify whether this block address appears in the table M(B) in the memory 20, and then to decide whether the block 45 is to be read or substitute information is to be read from the memory 20. However, it is alternatively possible that the control unit 10 is adapted to first read the addresses B of defective blocks 45* from the memory 20 before starting to carry out a read command, as a result of which the control unit 10 already knows whether or not a block is defective on receipt of this block.

The fast auxiliary memory 20 can be any suitable fast auxiliary memory, as will be evident to one skilled in the art. Suitable auxiliary memories are, for example, magnetic or optical discs. Alternatively, a solid-state memory or RAM can be a suitable memory.

In summary, the present invention provides a method of and an apparatus for writing data onto and reading data from a recording medium such as an optical disc, a magnetic disc and, particularly, a tape. When a block of the recording medium is defective the data to be recorded in said block is stored in an auxiliary memory. Subsequently, all the data is copied from the auxiliary memory to a predetermined spare area of the recording medium. Conversely, when the recording medium is read, the data is first copied from the spare area of the recording medium to the auxiliary memory. When a block appears to be defective the correct information is read into the auxiliary memory.

Thus, it is possible to write and or read a real-time audio and/or video signal in a reliable manner without the data transfer rate being adversely affected by the possible presence of any defective blocks.

It will be evident to one skilled in the art that the scope of the present invention is not limited to the examples described hereinbefore but that that various changes and modifications thereto are possible without departing from the scope of the invention as defined in the appended Claims. For example, depending on the field of use, it is alternatively possible to divide the spare recording area over a plurality of locations on the tape. For example, an associated spare recording area r may be provided at the beginning or end of each file f.

Furthermore, it is possible to copy the spare data from the auxiliary memory to the spare recording area in response to an appropriate command to terminate the prior recording session(s), without a removal of the tape being required.

The invention claimed is:

1. A method of recording information onto a recording medium having at least one recording track divided into logic blocks;

wherein a predetermined part of the recording medium is reserved as a spare recording area;

wherein the information file to be recorded is divided into data packets; and wherein a file writing session comprises the steps of:

a) receiving a data packet to be recorded into a buffer and recording said a data packet in a block of the recording medium (2) in a block writing session;
b) examining whether said block is a defective block (45*);
c) storing said data packet in an auxiliary memory (20) that has faster access times than the buffer in an auxiliary writing session if said block appears to be a defective block (45*);
d) repeating the steps (a) through (c) for all the data packets in the information file;
e) subsequently, in a substitute writing session, copying the data packets stored in the auxiliary memory (20) to said spare recording area (3) of the recording medium (2).

2. A method as claimed in claim 1, wherein the step (e) directly follows the step (d).

3. A method as claimed in claim 1, wherein a plurality of information files are recorded on the recording medium (2), the steps (a) through (d) being carried out for each file, after which the substitute writing session of the step (e) is carried out for all the files.

4. A method as claimed in claim 3, wherein the substitute writing session of the step (c) is carried out in response to the receipt of a command to remove the recording medium (2) from the recording apparatus (1) or in response to the receipt of a command to turnoff the recording apparatus (1).

5. A method of reading information from a recording medium (2), comprising the following steps:
a) copying the data packets stored in the spare recording area (3) of the recording medium (2), including the bookkeeping data (M (B)), to an auxiliary memory (20) in a preparatory session;
b) examining whether the block address of a block to be read from the recording medium appears in a substitution table comprising bookkeeping data (M (B));
c) reading the data in the block to be read (45) if in the step (b) said block address (B) is found not to appear in said substitution table, and supplying the data thus read to an output (21), but if in the step (b) said block address (B) is found to appear in said substitution table, reading substitute data from the section having the start address (M (B)) in said auxiliary memory (20) and presenting the read substitute data to the output (21);
d) repeating the steps (b)–(c) for all the blocks of a file (f).

6. A recording apparatus for recording information on a recording medium having at least one recording track divided into logic blocks, comprising:
a control unit having at input for receiving an information signal to be recorded into a buffer;
write means for writing on the recording medium;
auxiliary memory means having faster access times than the buffer being associated with the control unit;
wherein the control unit is adapted to record a data packet in a block of the recording medium or, if said block is found to be a defective block, to store said data packet in a section of the auxiliary memory; and
wherein the control unit is adapted to copy any data packets stored in the auxiliary memory to a predetermined spare recording area of the recording medium when all the data packets of an information file have been recorded.

7. A recording apparatus as claimed in claim 6, wherein the control unit (10) is adapted to store each data packet recorded in a block of the recording medium (2) also in the buffer, and to copy said data packet from the buffer to the auxiliary memory if the relevant block is found to be a defective block.

8. A recording apparatus as claimed in claim 6, wherein the control unit (10) is adapted to also store bookkeeping data (M(B)) in the auxiliary memory (20), which bookkeeping data defines a relationship between block numbers (B) of defective blocks (45*) and start addresses (M) of sections in the auxiliary memory (20) where data packets have been stored temporarily.

9. A recording apparatus as claimed in claim 6, wherein the control unit (10) is adapted to copy (16) any data packets stored in the auxiliary memory (20) to the predetermined spare recording area (3) of the recording medium (2) only when a command is received to enable ejection of or to eject the recording medium (2), or when a command is received to turn off the apparatus (1).

10. A read apparatus for reading information from a recording medium (2) having at least one recording track divided into logic blocks (45) and having a spare recording area (3), comprising:
a control unit (10) having an output (21) for outputting an information signal read (Q);
read means (4) for reading the recording medium (2);
auxiliary memory means (20) associated with the control unit (10);
wherein the control unit (10) is adapted to initially copy data packets, including bookkeeping data (M(B)), stored in the spare recording area (3) of the recording medium (2) to the auxiliary memory (20);
wherein the control unit (10) is adapted to examine whether the block address (B) of a block to be read from the recording medium (2) appears in a substitution table comprising the bookkeeping data (M(B));
wherein the control unit (10) is further adapted to read the data from a block (45) and supply (18) said data to the output (18) if a block address (B) of said block does not appear in said substitution table, and to read substitute data from the section having start address (M(B)) from said auxiliary memory (20) and supply (19) said substitute data to the output (21) if the block address (B) is found to appear in said substitution table.

11. An apparatus as claimed in claim 10, wherein a plurality of information files are read from on the recording medium.

12. An apparatus as claimed in claim 10, wherein a substitute reading session is carried out in response to the receipt of a command to remove the recording medium from the read apparatus.

13. An apparatus as claimed in claim 10, wherein the spare recording area contains substitute recordings of data packets which correspond to defective blocks on the recording medium, as well as a table (M (B)) of bookkeeping data.

14. An apparatus as claimed in claim 10, wherein the recording medium is a tape, and said spare recording area of the tape being situated at the beginning of the tape.

15. An apparatus as claimed in claim 10, wherein the control unit is adapted to read each data packet recorded in a block of the recording medium and also place the packet into a buffer and to copy said data packet from the buffer to the auxiliary memory means if the block is found to be a defective block.

16. An apparatus as claimed in claim 10, wherein the control unit is adapted to also store bookkeeping data (M(B)) in the auxiliary memory means, which bookkeeping data defines a relationship between block numbers of defective blocks and start addresses of sections in the auxiliary memory where data packets have been stored.

* * * * *